(12) United States Patent
Ogura et al.

(10) Patent No.: US 8,472,790 B2
(45) Date of Patent: Jun. 25, 2013

(54) DIGITAL CINEMA MANAGEMENT DEVICE AND DIGITAL CINEMA MANAGEMENT METHOD

(75) Inventors: Misato Ogura, Kanagawa (JP); Katsumi Ogawa, Kanagawa (JP)

(73) Assignee: Sony Corporation (JP)

( * ) Notice: Subject to any disclaimer, the term of this patent is extended or adjusted under 35 U.S.C. 154(b) by 325 days.

(21) Appl. No.: 12/661,292

(22) Filed: Mar. 15, 2010

(65) Prior Publication Data
US 2010/0247069 A1    Sep. 30, 2010

(30) Foreign Application Priority Data
Mar. 27, 2009    (JP) ................... P2009-079884

(51) Int. Cl.
*H04N 5/76*    (2006.01)

(52) U.S. Cl.
USPC ............... 386/295; 386/291; 386/294

(58) Field of Classification Search
USPC ............ 386/200–234, 291–299; 725/86–104, 725/145, 115
See application file for complete search history.

(56) References Cited

U.S. PATENT DOCUMENTS

| | | | |
|---|---|---|---|
| 6,760,535 B1 | 7/2004 | Orr | |
| 6,766,357 B1 * | 7/2004 | Fandozzi | ............ 709/213 |
| 6,812,994 B2 | 11/2004 | Bubie et al. | |
| 7,034,916 B2 | 4/2006 | Bubie et al. | |
| 7,236,227 B2 | 6/2007 | Whyte et al. | |
| 2002/0103597 A1 * | 8/2002 | Takayama et al. | ............ 701/200 |
| 2002/0122051 A1 | 9/2002 | Hose et al. | |
| 2003/0097423 A1 * | 5/2003 | Ozawa et al. | |
| 2005/0057724 A1 * | 3/2005 | Patton et al. | |
| 2005/0076372 A1 | 4/2005 | Moore et al. | |
| 2005/0155070 A1 * | 7/2005 | Slaughter | ............ 725/86 |
| 2006/0015927 A1 | 1/2006 | Antonellis et al. | |
| 2008/0281872 A1 | 11/2008 | Mizuno | |
| 2009/0132453 A1 * | 5/2009 | Hangartner et al. | ............ 706/46 |
| 2009/0132546 A1 * | 5/2009 | Kurata et al. | ............ 707/10 |

FOREIGN PATENT DOCUMENTS

| | | | |
|---|---|---|---|
| EP | 1650627 A2 | 4/2006 | |
| JP | 2003-244625 A | 8/2003 | |
| JP | 2004-222245 A | 8/2004 | |
| JP | 2005-286561 A | 10/2005 | |
| WO | 9959335 A1 | 11/1999 | |
| WO | 20080003718 A2 | 1/2008 | |

OTHER PUBLICATIONS

European Search Report EP 10156514 dated Jun. 7, 2010.

* cited by examiner

*Primary Examiner* — Hung Dang
(74) *Attorney, Agent, or Firm* — Lerner, David, Littenberg, Krumholz & Mentlik, LLP

(57) ABSTRACT

A digital cinema management device includes a control unit that supplies data of contents stored in a storage device to a playback device, in which the control unit refers to the contents stored in the storage device, contents stored in a content storage unit of the playback device, and an exhibition schedule, selects contents which are scheduled to be exhibited by the playback device, and which are not stored in the content storage unit, from the storage device, and supplies data of the selected contents to the playback device.

9 Claims, 13 Drawing Sheets

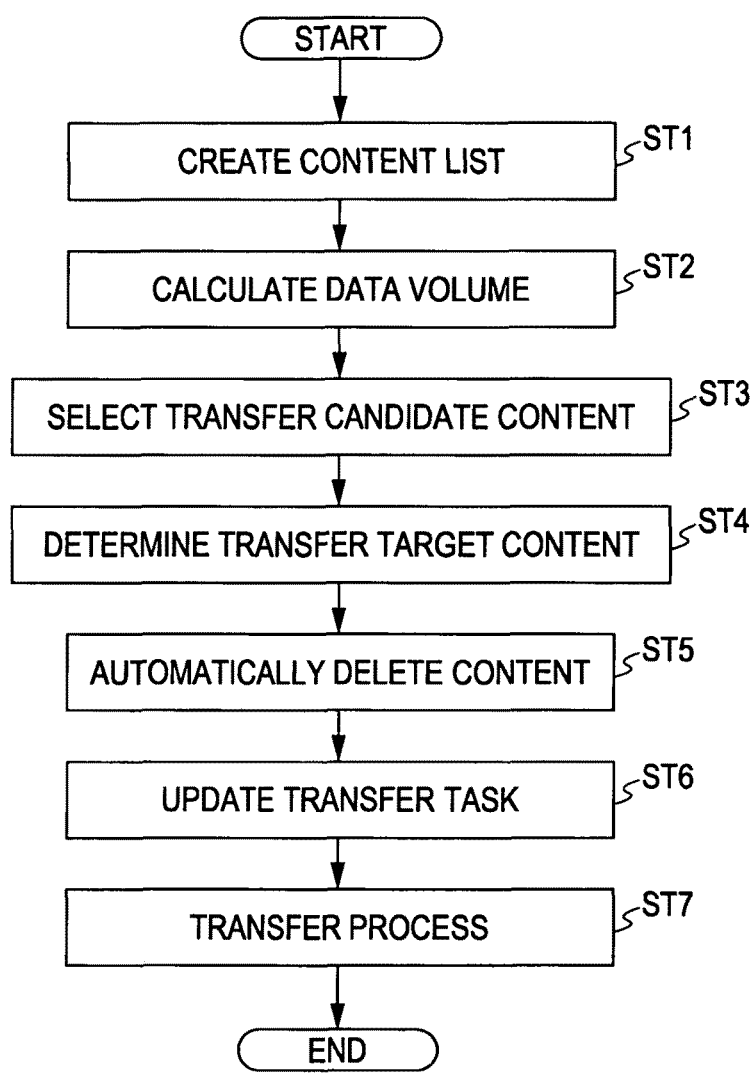

FIG. 5A

CURRENT TIME: 2/1/2009 9:00

| No. | TITLE | AUDITORIUM No. | DATE |
|---|---|---|---|
| 1 | MAIN FEATURE A | 1 | 2/2/2009 10:00 |
| 2 | TRAILER A | 1 | 2/2/2009 10:15 |
| 3 | TRAILER 1 | 1 | 2/4/2009 10:00 |
| 4 | MAIN FEATURE 1 | 1 | 2/4/2009 10:15 |
| 5 | TRAILER 2 | 1 | 2/9/2009 14:00 |
| 6 | MAIN FEATURE 2 | 1 | 2/9/2009 14:15 |
| 7 | TRAILER 3 | 1 | 2/12/2009 18:00 |
| 8 | MAIN FEATURE 3 | 1 | 2/12/2009 18:20 |
| 9 | TRAILER B | 2 | 2/3/2009 10:00 |
| 10 | MAIN FEATURE C | 2 | 2/3/2009 10:15 |
| 11 | TRAILER 1 | 2 | 2/5/2009 10:00 |
| 12 | MAIN FEATURE 4 | 2 | 2/5/2009 10:15 |
| 13 | TRAILER 2 | 2 | 2/10/2009 14:00 |
| 14 | MAIN FEATURE 5 | 2 | 2/10/2009 14:10 |
| 15 | TRAILER 3 | 2 | 2/15/2009 18:00 |
| 16 | MAIN FEATURE 6 | 2 | 2/15/2009 18:20 |

FIG. 5B

CURRENT TIME: 2/1/2009 9:00

| No. | TITLE | AUDITORIUM No. | VOLUME | DELETION LOCK FLAG |
|---|---|---|---|---|
| 1 | TRAILER A | 1 | 20 | |
| 2 | MAIN FEATURE A | 1 | 280 | |
| 3 | MAIN FEATURE B | 1 | 300 | |
| 4 | MAIN FEATURE X | 1 | 100 | 1 |
| 5 | MAIN FEATURE 3 | 1 | 350 | |
| 6 | TRAILER B | 2 | 20 | |
| 7 | TRAILER C | 2 | 15 | |
| 8 | MAIN FEATURE C | 2 | 270 | |

FIG. 5C

CURRENT TIME: 2/1/2009 9:00

| No. | TITLE | VOLUME |
|---|---|---|
| 1 | TRAILER 1 | 20 |
| 2 | TRAILER 2 | 15 |
| 3 | TRAILER 3 | 25 |
| 4 | TRAILER A | 20 |
| 5 | TRAILER B | 20 |
| 6 | TRAILER C | 15 |
| 7 | MAIN FEATURE A | 280 |
| 8 | MAIN FEATURE B | 300 |
| 9 | MAIN FEATURE C | 270 |
| 10 | MAIN FEATURE 1 | 300 |
| 11 | MAIN FEATURE 3 | 350 |
| 12 | MAIN FEATURE 4 | 320 |
| 13 | MAIN FEATURE X | 100 |

FIG. 6

| No. | TITLE | AUDITORIUM No. | DATE | VOLUME | |
|---|---|---|---|---|---|
| 1 | MAIN FEATURE A | 1 | 2/2/2009 10:00 | 280 | |
| 2 | TRAILER A | 1 | 2/2/2009 10:15 | 20 | |
| 3 | TRAILER 1 | 1 | 2/4/2009 10:00 | 20 | |
| 4 | MAIN FEATURE 1 | 1 | 2/4/2009 10:15 | 300 | |
| 5 | TRAILER 2 | 1 | 2/9/2009 14:00 | 15 | |
| 6 | MAIN FEATURE 2 | 1 | 2/9/2009 14:15 | 250 | ← ESTIMATE |
| 7 | TRAILER 3 | 1 | 2/12/2009 18:00 | 25 | |
| 8 | MAIN FEATURE 3 | 1 | 2/12/2009 18:20 | 350 | |
| 9 | TRAILER B | 2 | 2/3/2009 10:00 | 20 | |
| 10 | MAIN FEATURE C | 2 | 2/3/2009 10:15 | 270 | |
| 11 | TRAILER 1 | 2 | 2/5/2009 10:00 | 20 | |
| 12 | MAIN FEATURE 4 | 2 | 2/5/2009 10:15 | 320 | |
| 13 | TRAILER 2 | 2 | 2/10/2009 14:00 | 15 | |
| 14 | MAIN FEATURE 5 | 2 | 2/10/2009 14:10 | 280 | ← ESTIMATE |
| 15 | TRAILER 3 | 2 | 2/15/2009 18:00 | 25 | |
| 16 | MAIN FEATURE 6 | 2 | 2/15/2009 18:20 | 300 | ← ESTIMATE |

FIG. 7

| No. | TITLE | AUDITORIUM No. | DATE | VOLUME |
|---|---|---|---|---|
| 1 | MAIN FEATURE A | 1 | 2/2/2009 10:00 | 280 |
| 2 | TRAILER A | 1 | 2/2/2009 10:15 | 20 |
| 3 | TRAILER 1 | 1 | 2/4/2009 10:00 | 20 |
| 4 | MAIN FEATURE 1 | 1 | 2/4/2009 10:15 | 300 |
| 5 | TRAILER 2 | 1 | 2/9/2009 14:00 | 15 |
| 6 | MAIN FEATURE 2 | 1 | 2/9/2009 14:15 | 250 |
| 7 | TRAILER 3 | 1 | 2/12/2009 18:00 | 25 |
| 8 | MAIN FEATURE 3 | 1 | 2/12/2009 18:20 | 350 |
| 9 | TRAILER B | 2 | 2/3/2009 10:00 | 20 |
| 10 | MAIN FEATURE C | 2 | 2/3/2009 10:15 | 270 |
| 11 | TRAILER 1 | 2 | 2/5/2009 10:00 | 20 |
| 12 | MAIN FEATURE 4 | 2 | 2/5/2009 10:15 | 320 |
| 13 | TRAILER 2 | 2 | 2/10/2009 14:00 | 15 |
| 14 | MAIN FEATURE 5 | 2 | 2/10/2009 14:10 | 280 |
| 15 | TRAILER 3 | 2 | 2/15/2009 18:00 | 25 |
| 16 | MAIN FEATURE 6 | 2 | 2/15/2009 18:20 | 300 |

885 GB (IN TOTAL) — rows 1–8, with rows 3–8 totaling 585 GB

950 GB (IN TOTAL) — rows 9–16, with rows 11–16 totaling 660 GB

FIG. 8

| No. | TITLE | AUDITORIUM No. | DATE | VOLUME | |
|---|---|---|---|---|---|
| 1 | MAIN FEATURE A | 1 | 2/2/2009 10:00 | 280 | |
| 2 | TRAILER A | 1 | 2/2/2009 10:15 | 20 | |
| 3 | TRAILER 1 | 1 | 2/4/2009 10:00 | 20 | EXCLUDED BECAUSE IT IS INCLUDED IN TRANSFER TASK. |
| 4 | MAIN FEATURE 1 | 1 | 2/4/2009 10:15 | 300 | |
| 5 | TRAILER 2 | 1 | 2/9/2009 14:00 | 15 | |
| 6 | MAIN FEATURE 2 | 1 | 2/9/2009 14:15 | 250 | EXCLUDED BECAUSE IT IS NOT PRESENT IN STORAGE DEVICE. |
| 7 | TRAILER 3 | 1 | 2/12/2009 18:00 | 25 | |
| 8 | MAIN FEATURE 3 | 1 | 2/12/2009 18:20 | 350 | |
| 9 | TRAILER B | 2 | 2/3/2009 10:00 | 20 | |
| 10 | MAIN FEATURE C | 2 | 2/3/2009 10:15 | 270 | |
| 11 | TRAILER 1 | 2 | 2/5/2009 10:00 | 20 | EXCLUDED BECAUSE IT IS INCLUDED IN TRANSFER TASK. |
| 12 | MAIN FEATURE 4 | 2 | 2/5/2009 10:15 | 320 | |
| 13 | TRAILER 2 | 2 | 2/10/2009 14:00 | 15 | |
| 14 | MAIN FEATURE 5 | 2 | 2/10/2009 14:10 | 280 | EXCLUDED BECAUSE IT IS NOT PRESENT IN STORAGE DEVICE. |
| 15 | TRAILER 3 | 2 | 2/15/2009 18:00 | 25 | |
| 16 | MAIN FEATURE 6 | 2 | 2/15/2009 18:20 | 300 | |

TRANSFER CANDIDATE CONTENTS

FIG. 9

| No. | TITLE | AUDITORIUM No. | DATE | STATUS | VOLUME | TRANSFER METHOD |
|---|---|---|---|---|---|---|
| 1 | TRAILER 1 | 1 | 2/4/2009 10:00 | UNDER TRANSFER | 20 | AUTO |
| 2 | TRAILER 1 | 2 | 2/5/2009 10:00 | UNDER TRANSFER | 20 | AUTO |
| 3 | TRAILER B | 1 | 2/6/2009 10:00 | UNDER TRANSFER | 20 | AUTO |
| 4 | TRAILER C | 1 | 2/6/2009 11:00 | WAITING | 15 | AUTO |

FIG. 10

| No. | TITLE | AUDITORIUM No. | VOLUME | DELETION LOCK FLAG |
|---|---|---|---|---|
| 1 | TRAILER A | 1 | 20 | |
| 2 | MAIN FEATURE A | 1 | 280 | |
| 3 | MAIN FEATURE B | 1 | 300 | |
| 4 | MAIN FEATURE X | 1 | 100 | 1 |
| 5 | MAIN FEATURE 3 | 1 | 350 | |
| 6 | TRAILER B | 2 | 20 | |
| 7 | TRAILER C | 2 | 15 | |
| 8 | MAIN FEATURE C | 2 | 270 | |

Rows 3, 5, 7: DELETED AUTOMATICALLY
Row 4: NOT DELETED AUTOMATICALLY

Rows 3–5 and row 7: DELETION CANDIDATE CONTENTS

FIG. 11

| No. | TITLE | AUDITORIUM No. | DATE | STATUS | VOLUME | TRANSFER METHOD |
|---|---|---|---|---|---|---|
| 1 | TRAILER 1 | 1 | 2/4/2009 10:00 | UNDER TRANSFER | 20 | AUTO |
| 2 | TRAILER 1 | 2 | 2/5/2009 10:00 | UNDER TRANSFER | 20 | AUTO |
| 3 | MAIN FEATURE 1 | 1 | 2/4/2009 10:15 | WAITING | 300 | AUTO |
| 4 | MAIN FEATURE 4 | 2 | 2/5/2009 10:15 | WAITING | 320 | AUTO |
| 5 | TRAILER 2 | 1 | 2/9/2009 14:00 | WAITING | 15 | AUTO |
| 6 | TRAILER 2 | 2 | 2/10/2009 14:00 | WAITING | 15 | AUTO |
| 7 | TRAILER 3 | 2 | 2/15/2009 18:00 | WAITING | 25 | AUTO |

DIGITAL CINEMA MANAGEMENT DEVICE AND DIGITAL CINEMA MANAGEMENT METHOD

CROSS-REFERENCE TO RELATED APPLICATION

The present application claims priority from Japanese Patent Application No. JP 2009-079884 filed in the Japanese Patent Office on Mar. 27, 2009, the entire content of which is incorporated herein by reference.

BACKGROUND OF THE INVENTION

1. Field of the Invention

The present invention relates to a digital cinema management device and a digital cinema management method. More particularly, the present invention relates to a technique of enabling data of content that is scheduled for exhibition to be automatically supplied to a playback device.

2. Description of the Related Art

With the progress of digital technology, the environment of the movie industries is converting from film to digital signals, and movies are produced using video equipment and played using a projector and the like. For realization of such a digital cinema, a data compression technique, an encryption technique for copyright protection, and the like are used in addition to picture and sound techniques for a faithful representation of images and sound intended by a producer.

When movies are shown on screens, data of a certain format created by a server installed in a movie distribution company are provided to individual theaters, and the data provided to the individual theaters are played with playback devices, whereby exhibition of a digital cinema is carried out. As the format of the data provided from the movie distribution company to the individual theaters, a format is used, for example, which is called a Digital Cinema Package (DCP), and which is compliant with the specifications proposed by the Digital Cinema Initiatives (DCI).

Japanese Unexamined Patent Application Publication No. 2003-244625 discloses a technique of transmitting data regarding the schedules for movies to be exhibited to an exhibition server unit and transmitting the contents of the movies to a cinema server so that the operations of editing or reorganizing the contents to be exhibited and creating the exhibition schedule can be performed by a single operation on a screen display.

SUMMARY OF THE INVENTION

However, when the number of auditoriums increases, the management of the schedule as to which content will be exhibited in which auditorium becomes complex. In addition, it will be unable to exhibit the content on the scheduled time unless data and the like of the content to be exhibited are supplied to a playback device ahead of an exhibition start time.

It is therefore desirable to provide a digital cinema management device and a digital cinema management method capable of facilitating the supply of data and the like of content that is necessary for a playback device.

According to an embodiment of the present invention, there is provided a digital cinema management device including a control unit that supplies data of contents stored in a storage device to a playback device, in which the control unit refers to the contents stored in the storage device, contents stored in a content storage unit of the playback device, and an exhibition schedule, selects contents which are scheduled to be exhibited by the playback device, and which are not stored in the content storage unit, from the storage device, and supplies data of the selected contents to the playback device.

In the embodiment of the present invention, contents which are scheduled to be exhibited by the playback device and which are not stored in the content storage unit are selected from the storage device by referring to the contents stored in the storage device, the contents stored in the content storage unit of the playback device, and the exhibition schedule. Here, the contents are selected in the order of the exhibition schedule so as not to exceed a rewritable data capacity of the content storage unit, and data of contents that are not included in the selected contents are deleted from the content storage unit. Thereafter, contents obtained by excluding contents which are stored in the content storage unit, or contents which are not stored in the storage device, from the contents selected in the order of the exhibition schedule so as not to exceed the rewritable data capacity of the content storage unit are set as transfer target contents, and data of the transfer target contents are supplied to the playback device. In addition, transfer tasks are created when content data are supplied to the playback device, so that the data are supplied based on the transfer tasks, and tasks for transferring data of the transfer target content are registered on the transfer tasks while excluding tasks which have already been registered. Moreover, the process of selecting contents which are not stored and supplying the contents to the playback device is performed, for example, when the exhibition schedule is changed, addition or alteration of content data occurs in the storage device, addition, alteration, or deletion occurs in the content data in the content storage unit of the playback device, and communication with the playback device is recovered.

According to another embodiment of the present invention, there is provided a digital cinema management method including the steps of causing a control unit that supplies data of contents stored in a storage device to a playback device to refer to the contents stored in the storage device, contents stored in a content storage unit of the playback device, and an exhibition schedule, thereby selecting contents which are scheduled to be exhibited by the playback device, and which are not stored in the content storage unit, from the storage device, and causing the control unit to supply data of the selected contents to the playback device.

According to the embodiments of the present invention, the contents which are scheduled to be exhibited by the playback device and which are not stored in the content storage unit are selected from the storage device by referring to the contents stored in the storage device, the contents stored in the content storage unit of the playback device, and the exhibition schedule, and the data of the selected contents are supplied to the playback device. Therefore, data or the like of necessary contents can be easily supplied to the playback device without causing any problem at the time of exhibition.

BRIEF DESCRIPTION OF THE DRAWINGS

FIG. 4 is a flowchart illustrating an automated content transfer process performed by a control unit.

FIGS. 5A to 5C are diagrams illustrating a content list.

FIG. 6 is a diagram illustrating a state where "Volume" information is added in a necessary content list.

FIG. 7 is a diagram illustrating transfer candidate contents.

FIG. 8 is a diagram illustrating transfer target contents.

FIG. 9 is a diagram illustrating transfer tasks before transfer target contents are registered.

FIG. 10 is a diagram illustrating contents that are set as contents for automatic deletion.

FIG. 11 is a diagram illustrating transfer tasks after transfer target contents are registered.

DESCRIPTION OF THE PREFERRED EMBODIMENTS

Figure 1:
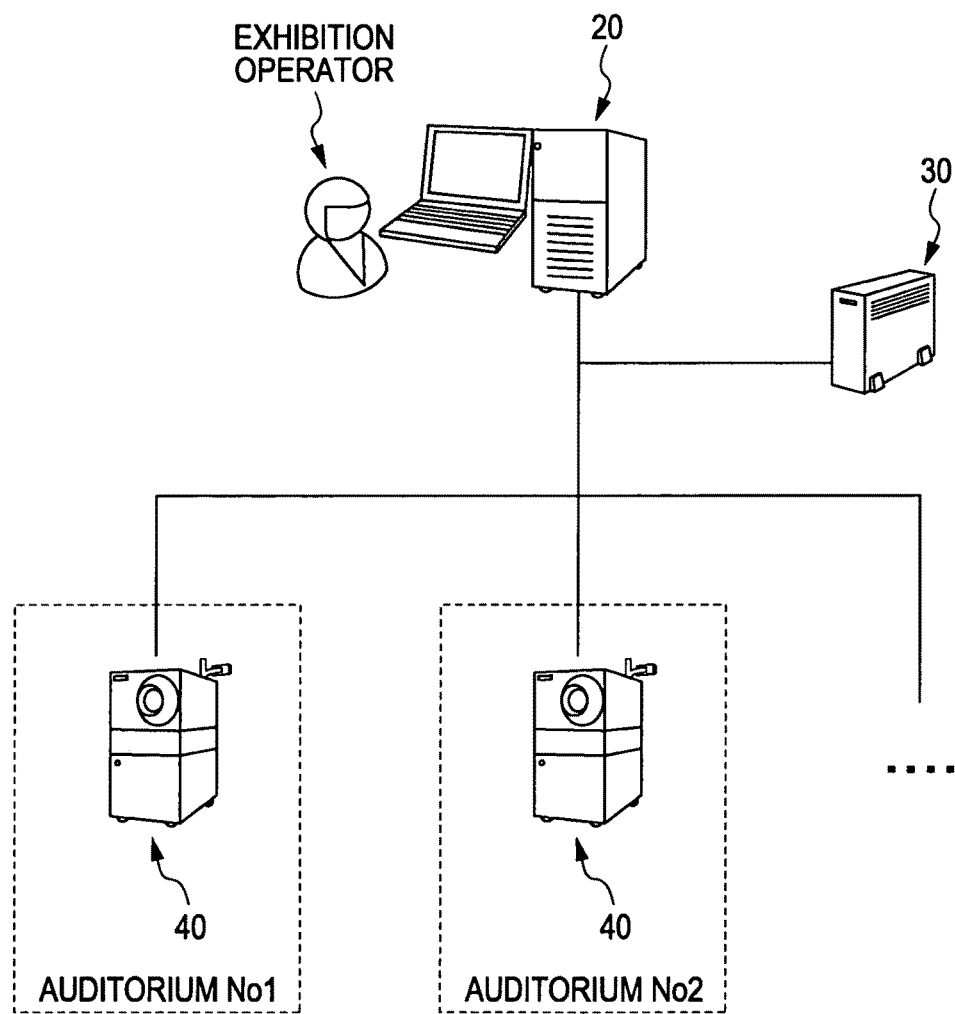
FIG. 1 is a diagram illustrating a schematic configuration of a digital cinema system.

Hereinafter, preferred embodiments of the present invention will be described. The description will be given in the following order:

1. Configuration of Digital Cinema System;
2. Structure of Digital Cinema Package (DCP);
3. Configuration of Management Device and Playback Device and
4. Operation of Management Device 1. Configuration of Digital Cinema System FIG. 1 illustrates a schematic configuration of a digital cinema system. A digital cinema system 10 is configured by using a digital cinema management device (hereinafter referred to as a "management device") 20, a central storage device (hereinafter referred to as a "storage device") 30, and a playback device 40 which is installed in each auditorium.

The management device 20 creates the schedules for contents to be exhibited by the playback device 40. Moreover, the management device 20 reads data of the contents exhibited by the playback device 40 from the storage device 30 and supplies the data to the playback device 40.

The storage device 30 stores the data and the like of the contents exhibited by the playback device 40. The storage device 30 may be a storage device that uses redundant arrays of inexpensive disks (RAID), for example.

The playback device 40 includes a content storage unit, a decoding unit, a projector, a sound output unit, and the like. The playback device 40 supplies the data of contents stored in the content storage unit to the decoding unit according to a schedule. The decoding unit decodes the data of contents to obtain data of pictures and subtitles and outputs them to the projector. Moreover, the decoding unit decodes the data of contents to obtain data of sound and outputs them to the sound output unit. In this way, exhibition of a digital cinema can be carried out by the playback device 40 that is installed in an auditorium.

The management device 20 is connected to a theater ticketing system (not illustrated) that provides an exhibition schedule to newspapers or other sources ahead of a scheduled exhibition day. The exhibition schedule includes information on events representing which movies will be exhibited on which day and time and in which auditorium. The management device acquires the information on the events from the theater ticketing system to create schedules.

For example, the management device 20 creates the schedules using a show template. The management device 20 displays a show template. An exhibition operator sets cinema advertisement (theater advertisements), trailers (movie announcements), and main features of movies according to the show template. For example, when a format, called a Digital Cinema Package (DCP), is used, a composition playlist CPL described later or a program containing a group of composition playlists CPLs is set in the show template. The use of such a show template facilitates the scheduling operation of the exhibition operator.

Here, an exhibition of one event based on the list set in the show template is referred to as a "show". Moreover, the lists set in the show template are collectively referred to as a "show playlist". That is to say, a show of one event is presented by performing playback or the like of data based on the show playlist. Furthermore, by correlating events with the show playlist, a show can be presented at the time of each event by performing playback or the like of data based on the show playlist at the time described in the events. During the show, the lighting, the screen size, and the like are controlled.

In addition, the format used with the digital cinema system 10 is not limited to the Digital Cinema Package DCP (hereinafter referred to as DCP), but an MPEG format may be used for a cinema advertisement, for example.

2. Structure of Digital Cinema Package (DCP)

Figure 2:
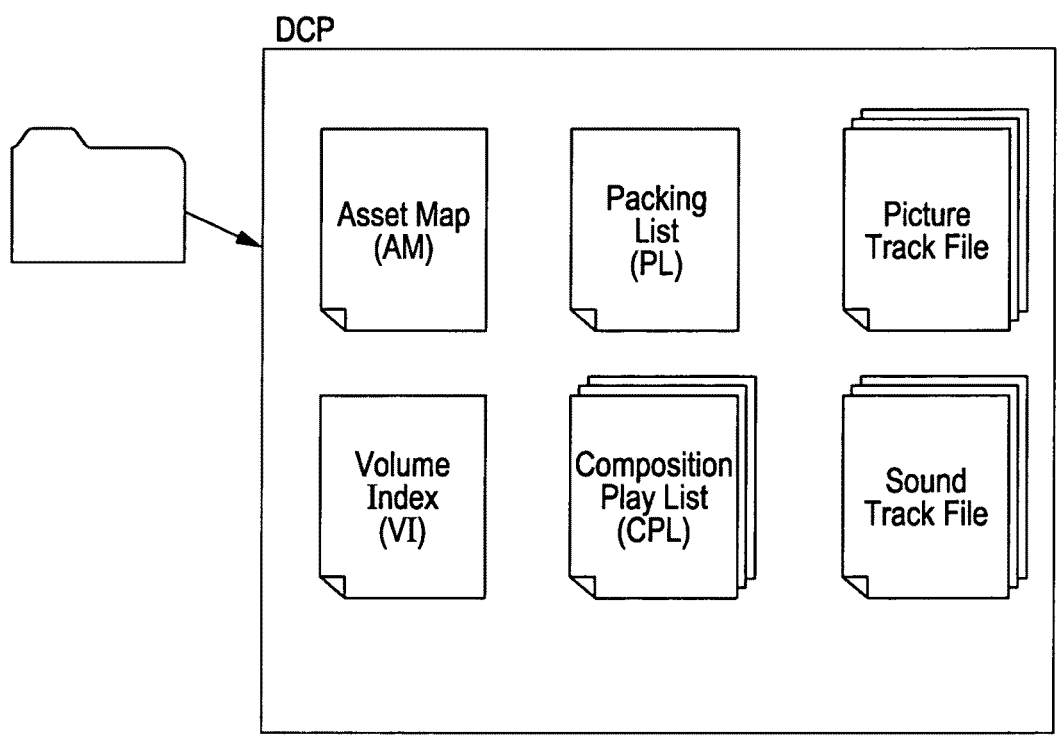
FIG. 2 is a diagram illustrating a file structure of a DCP.

Next, a file structure of a typical DCP will be described. FIG. 2 is an explanatory diagram illustrating the file structure of a typical DCP.

Contents of a digital cinema are distributed in a data format called a DCP, which is compliant with the specifications proposed by the Digital Cinema Initiatives (DCI). The DCP is a set of various types of data files necessary for exhibition of a digital cinema.

As illustrated in FIG. 2, for example, a DCP includes an asset map (AM), a volume index (VI), a packing list (PL), and a composition playlist (CPL). The DCP further includes a picture track file, a sound track file, and the like. Each of these files has assigned thereto globally unique identification information, such as a universal unique identifier (UUID), and the UUID of each file is described in the file. Now, the files constituting the DCP will be described below.

Asset Map (AM)

An asset map describes a list regarding all the files (except the asset map itself) included in one DCP. More specifically, the asset map describes a list that associates the UUIDs described in the individual files in the DCP with the file names of the files. The asset map can be used, for example, for enabling users to identify the individual files included in the DCP. The asset map is created for each digital cinema, and even when the DCP is divided as will be described later, only one asset map that is common to a plurality of divided DCPs is created for one digital cinema. A subtitle PNG file described later has a format such that it is unable to describe a UUID therein. Therefore, by describing the file names of individual PNG files in the asset map to be correlated with the UUIDs thereof, it is possible to associate the individual PNG files with their UUIDs.

Volume Index (VI)

A volume index describes index information for identifying individual divided units in a case where a DCP is divided into a plurality of divided units (divided DCPs).

Packing List (PL)

A packing list describes a list that correlates the UUIDs of all the files (except the PL itself) included in one DCP with their hash values. The hash values are values obtained by hashing data of the individual files in the DCP. The hash values of individual files described in the packing list are compared with hash values of the individual files which are actually calculated, thus checking the degree of coincidence, whereby the integrity (e.g., whether or not data have been corrupted) of the individual files can be verified.

Composition Play List (CPL)

A composition playlist (hereinafter referred to as a "CPL") is a playlist used for exhibition of contents (pictures, sound, and subtitles) included in the DCP. The CPL is link information that correlates picture track files and sound track files (and/or subtitle track files) corresponding to each exhibition version of a digital cinema with each other. The CPL is created for each exhibition version of one digital cinema.

The CPL describes the UUIDs, data entry points, and durations of the individual files for all the reels, the files including picture track files, which are picture files, sound files, and/or subtitle files. The reels herein refer to units that are formed by dividing, in time, one exhibition unit which includes picture and sound (and subtitles as necessary). For example, in a case where one digital cinema (120 minutes) is divided equally, in time, into 10 units, 10 reels (12 minutes each) are created. The entry points are offsets representing exhibition start points of data of picture or sound files of the individual reels. The durations are size information representing the valid ranges of data from the entry points.

In a case where one digital cinema is composed of a plurality of reels, CPL describes information regarding all the reels (UUIDs of picture, sound, and subtitle files constituting the individual reels, and entry points and durations thereof), and all the reels constitute one unit of playing. Usually, a digital cinema is composed of a plurality of reels, so that reel information regarding all the reels is described together in one CPL.

An exhibition version refers to one exhibition unit of a digital cinema, such as a language version (e.g., an English-sound version, a Japanese-sound version, or a Japanese-subtitle version). The CPL is created for each exhibition version of one digital cinema.

Picture Track File

A picture track file is a file of picture data compressed according to a predetermined format. The picture track file is provided in a number corresponding to a necessary number of reels. Furthermore, a plurality of types of picture files (e.g., a picture file for an original version and a picture file for a replacement version) may be created for the same scene.

Sound Track File

A sound track file is a file of sound data compressed according to a predetermined format. The sound track file is provided in a number corresponding to a necessary number of reels. Furthermore, a plurality of types of sound files (e.g., a sound file for an original version and a sound file for a replacement version) may be created for the same scene.

The DCP also includes files (not illustrated) for subtitle representation.

3. Configuration of Management Device and Playback Device

Figure 3:
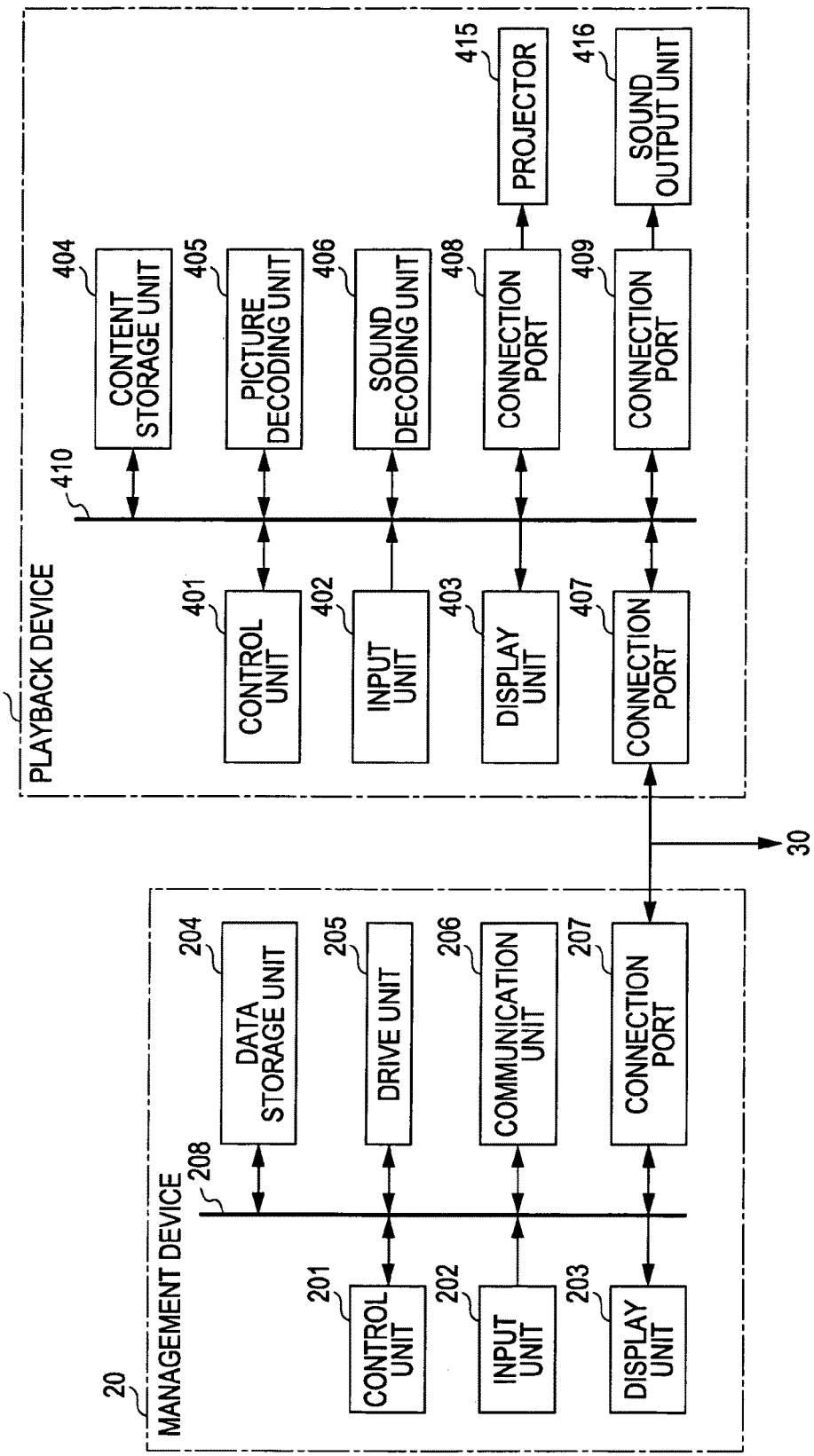
FIG. 3 is a diagram illustrating a configuration of a management device and a playback device.

FIG. 3 is a diagram illustrating a configuration of the management device 20 and the playback device 40.

The management device 20 includes a control unit 201, an input unit 202, a display unit 203, a data storage unit 204, a drive unit 205, a communication unit 206, a connection port 207, and a local bus 208 for connecting the units to each other.

The control unit 201 is configured by using a CPU, a ROM, and a RAM. The CPU executes programs stored in the ROM or programs loaded to the RAM from the data storage unit 204, thereby executing various types of processing in accordance with a user's operation based on operation signals from the input unit 202 described later. For example, the control unit 201 creates schedules and executes processing for causing the playback device 40 to perform exhibition of contents in accordance with the schedules.

The ROM of the control unit 201 stores programs used by the CPU, calculation parameters, and the like. The RAM temporarily stores programs used for execution by the CPU, parameters that change appropriately during execution of the programs, and the like.

The input unit 202 is configured by using, for example, a mouse, a keyboard, a touch panel, a button, a switch, and a lever. The input unit 202 outputs an operation signal in accordance with a user's operation on the input unit 202 to the control unit 201. The user can input various types of data to the management device 20 or instruct the management device 20 to perform processing operations by operating the input unit 202.

The display unit 203 is configured by using a display device such as a liquid crystal display (LCD). For example, the display unit 203 displays a management window or the like for managing exhibition operations performed by individual playback devices 40 of the digital cinema system.

The data storage unit 204 is configured by using, for example, a hard disk, a solid state drive (SSD), and the like. The data storage unit 204 stores various types of data, such as, for example, programs executed by the control unit 201, schedule information, logs, and show playlists.

The drive unit 205 writes or reads various types of data to/from a removable recording medium. For example, the drive unit 205 reads various types of data, such as, for example, material content of digital cinemas, DCPs, and configuration information which are recorded on the recording medium.

The communication unit 206 is a communication interface that is configured by, for example, a communication device for connecting the management device 20 to an external apparatus via a wireless or wired communication path. The management device 20 transmits/receives various types of data to/from the external apparatus via the communication unit 206. For example, the management device 20 receives data and the like of contents.

The connection port 207 is a port for connecting the management device 20 and the storage device 30 or the playback device 40 to each other. By connecting the storage device 30 or the playback device 40 to the connection port 207, various types of data can be communicated between the management device 20 and the storage device 30 or the playback device 40.

The playback device 40 includes a control unit 401, an input unit 402, a display unit 403, a content storage unit 404, a picture decoding unit 405, a sound decoding unit 406, connection ports 407, 408, and 409, and a local bus 410 for connecting the units to each other. The playback device 40 further includes a projector 415 and a sound output unit 416.

The control unit 401, the input unit 402, and the display unit 403 have substantially the same functional configuration as the control unit 201, the input unit 202, and the display unit 203 of the management device 20, respectively. The control unit 401 controls the respective units based on the schedule information or the like supplied from the management device 20 to perform exhibition of contents in accordance with the schedules.

The content storage unit 404 stores data of content to be exhibited. When picture data of content are compression encoded data, the picture decoding unit 405 decodes the compression encoded data. When sound data of content are compression encoded data, the sound decoding unit 406 decodes the compression encoded data. Moreover, when the picture or sound data are encrypted, the picture decoding unit 405 and the sound decoding unit 406 decrypts the encrypted picture or sound data by using a key provided from the management device 20.

The connection port 407 is a port for connecting the playback device 40 and the management device 20 or the storage device 30 to each other. With this connection port 407, various types of data can be communicated between the playback device 40 and the management device 20 or the storage device 30.

The connection port 408 is a port for connecting the projector 415. The connection port 409 is a port for connecting the sound output unit 416.

The projector 415 projects pictures of content on a screen based on picture data read from the content storage unit 404 or picture data decoded and/or decrypted by the picture decoding unit 405.

The sound output unit 416 is configured by using an amplifier, a speaker, and the like. The sound output unit 416 outputs sound of content based on sound data read from the content storage unit 404 or sound data decoded and/or decrypted by the sound decoding unit 406.

4. Operation of Management Device

In the digital cinema system 10, the control unit 201 of the management device 20 automatically performs control of supplying data and the like of contents necessary for the playback device 40 based on, for example, schedules of contents to be exhibited by the playback device 40, and a storage status of content data in the playback device 40. That is to say, the control unit 201 selects, from the storage device 30, contents which are scheduled to be exhibited by the playback device 40, and which are not stored in the content storage unit 404, by referring to the contents stored in the storage device 30, the contents stored in the content storage unit 404 of the playback device 40, and the exhibition schedule. In addition, the control unit 201 automatically supplies the data of the selected contents to the playback device 40.

FIG. 4 is a flowchart illustrating an automated content transfer process performed by the control unit 201. At step ST1, the control unit 201 creates a content list. Specifically, the control unit 201 creates a content list (hereinafter referred to as a "necessary content list") which represents the contents necessary for the playback device 40 based on the schedule information and the show playlist. Moreover, the control unit 201 identifies contents stored in the playback device 40 through communication with the playback device 40 and creates a content list (hereinafter referred to as an "acquired content list") which represents the contents stored in the playback device 40. Furthermore, the control unit 201 identifies contents stored in the storage device 30 through communication with the storage device 30 and creates a providable content list which represents the contents stored in the storage device 30.

FIG. 5A illustrates the necessary content list. For example, the necessary content list includes "Title" of content, "Auditorium No." representing an auditorium in which content is exhibited, and "Date" representing the time when the exhibition of content starts.

FIG. 5B illustrates the acquired content list. For example, the acquired content list includes "Title", "Auditorium No.", "Volume", and "Deletion Lock Flag". The "Title" represents a title of content. The "Auditorium No." represents the auditorium in which a playback device storing the data of content is installed. The "Volume" represents a data volume of content in the unit of GB (Gigabyte), for example. The "Deletion Lock Flag" enables to identify whether or not the data of contents stored in the playback device is allowed to be deleted.

FIG. 5C illustrates the providable content list. For example, the providable content list includes "Title" of content and "Volume" representing a data volume of the content represented by "Title".

At step ST2 of FIG. 4, the control unit 201 calculates a data volume. The control unit 201 adds "Volume" information to the respective contents of the necessary content list by using the providable content list. Moreover, the control unit 201 estimates the data volume of content which is not included in the providable content list. The control unit 201 estimates the data volume from the exhibition duration or the like of content, for example.

FIG. 6 illustrates a state where the "Volume" information is added in the necessary content list. Since the contents with the numbers "6, 14, and 16" in the necessary content list are not included in the providable content list, the data volumes of the contents are estimated from the exhibition duration or the like of the contents, for example.

At step ST3 of FIG. 4, the control unit 201 selects transfer candidate contents. The control unit 201 examines the capacity of the content storage unit in the playback device 40 and the volume of the contents of which the data are prohibited from being deleted based on the acquired content list, thus identifying a rewritable data capacity of the content storage unit in the playback device 40. For example, it will be assumed that the capacity of the content storage units in the playback devices of the auditoriums No1 and No2 is 1,000 GB. Moreover, as illustrated in FIG. 5B, when the data of content having a volume of 100 GB are prohibited from being deleted from the content storage unit in the playback device of the auditorium No1, the rewritable data capacity of the content storage unit in the playback device of the auditorium No1 will be 900 GB. Moreover, the rewritable data capacity of the content storage unit in the playback device of the auditorium No2 is 1,000 GB.

The control unit 201 selects contents from the necessary content list by an amount not exceeding the rewritable data capacity of the content storage unit in the order of time. In addition, the control unit 201 deletes contents which have already been stored from the selected contents and uses the remaining contents as the transfer candidate contents.

FIG. 7 illustrates the transfer candidate contents. In FIG. 7, it will be assumed that the rewritable data capacity of the content storage unit in the playback device of the auditorium No1 is 900 GB, and the rewritable data capacity of the content storage unit in the playback device of the auditorium No2 is 1,000 GB.

The control unit 201 selects contents for the playback device of the auditorium No1 from the necessary content list by an amount not exceeding 900 GB in the order of time. That is, the contents with the numbers "1 to 6 (885 GB in total)" are selected. Moreover, the control unit 201 deletes contents which have already been stored from the selected contents and uses the remaining contents as the transfer candidate contents. That is, since the contents with the numbers "1 and 2" are already stored, the contents with the numbers "3 to 6 (585 GB in total)" are used as the transfer candidate contents.

The control unit 201 selects contents for the playback device of the auditorium No2 from the necessary content list by an amount not exceeding 1,000 GB in the order of time. That is, the contents with the numbers "9 to 15 (950 GB in total)" are selected to be used as the transfer candidate contents. Moreover, the control unit 201 deletes contents which have already been stored from the selected contents and uses the remaining contents as the transfer candidate contents. That is, since the contents with the numbers "9 and 10" are already stored, the contents with the numbers "11 to 15 (660 GB in total)" are used as the transfer candidate contents.

At step ST4 of FIG. 4, the control unit 201 determines the transfer target contents for each playback device. The control unit 201 excludes the contents under transfer and the contents of which the data are not stored in the storage device 30 from the transfer candidate contents selected at step ST3 and determines the remaining contents as the transfer target contents.

FIG. 8 is a diagram for explaining the transfer target contents. Moreover, FIG. 9 illustrates transfer tasks before the transfer target contents are registered, in which a title "Trailer 1" is under transfer on the transfer tasks.

The control unit 201 excludes the contents with the numbers "3 and 11" (with the title "Trailer 1") which are under transfer as illustrated in FIG. 8 from the selected transfer candidate contents based on the transfer tasks illustrated in FIG. 9. Moreover, the control unit 201 excludes the contents with the numbers "6 and 14," the data of which are not stored in the storage device 30, from the selected transfer candidate contents based on the providable content list. That is to say, the control unit 201 determines the remaining contents with the numbers "4, 5, 12, 13, and 15" as the transfer target contents.

At step ST5 of FIG. 4, the control unit 201 performs automatic deletion of contents. The control unit 201 selects contents which are not included in the contents selected from the necessary content list so as not to exceed the rewritable data capacity, from the acquired content list and sets the selected contents as deletion candidate contents. Moreover, the control unit 201 excludes contents for which deletion is prohibited by "deletion lock flag" from the selected deletion candidate contents and sets the deletion candidate contents remaining after exclusion as contents for automatic deletion. In addition, the control unit 201 causes the playback device to delete the set contents for automatic deletion from the content storage unit. By doing so, since contents which are not scheduled for exhibition or contents of which the number of days left until the exhibition day is too large will be automatically deleted from the content storage unit, it is possible effectively to use the rewritable data capacity of the content storage unit.

FIG. 10 illustrates contents which are set as contents for automatic deletion in the acquired content list. The contents with the numbers "3 to 5 and 7" in the acquired content list are not included in the contents which are selected so as not to exceed the rewritable data capacity and are thus set as the deletion candidate contents. Moreover, the content with the number "4" is prohibited from being deleted by the deletion lock flag. Therefore, the contents with the numbers "3, 5, and 7" are set as the contents for automatic deletion. For this reason, the management device 20 causes the playback device 40 in the auditorium Not to delete data of the contents "Main Feature B" and "Main Feature 3" from the content storage unit 404. Moreover, the management device 20 causes the playback device 40 in the auditorium No2 to delete data of content "Trailer C" from the content storage unit 404.

At step ST6 of FIG. 4, the control unit 201 updates the transfer tasks. The control unit 201 deletes transfer tasks for contents which have become unnecessary with a change in the exhibition schedule. Moreover, the control unit 201 registers the determined transfer target contents on the transfer tasks. Furthermore, the control unit 201 determines the transfer tasks by sorting the transfer target contents in the order of status, time, and title after the transfer target contents are registered.

For example, in the transfer tasks illustrated in FIG. 9, the contents of which the data will be transferred by the transfer tasks with the numbers "3 and 4" are not included in the necessary content list illustrated in FIG. 5A. Therefore, the control unit 201 deletes the transfer tasks with the numbers "3 and 4". Moreover, the control unit 201 registers transfer tasks for transferring data of the transfer target contents with the numbers "4, 5, 12, 13, and 15" in FIG. 8 and determines the transfer tasks by sorting them in the order of status, time, and title.

When the transfer tasks are updated in the described manner, the transfer tasks illustrated in FIG. 9 will be updated to the transfer tasks as illustrated in FIG. 11.

At step ST7 of FIG. 4, the control unit 201 performs a transfer process. The control unit 201 transfers data of contents to the playback device in the order of the transfer tasks. Moreover, when a communication path has a sufficient bandwidth, the control unit 201 transfers a plurality of contents at the same time.

Figure 12:
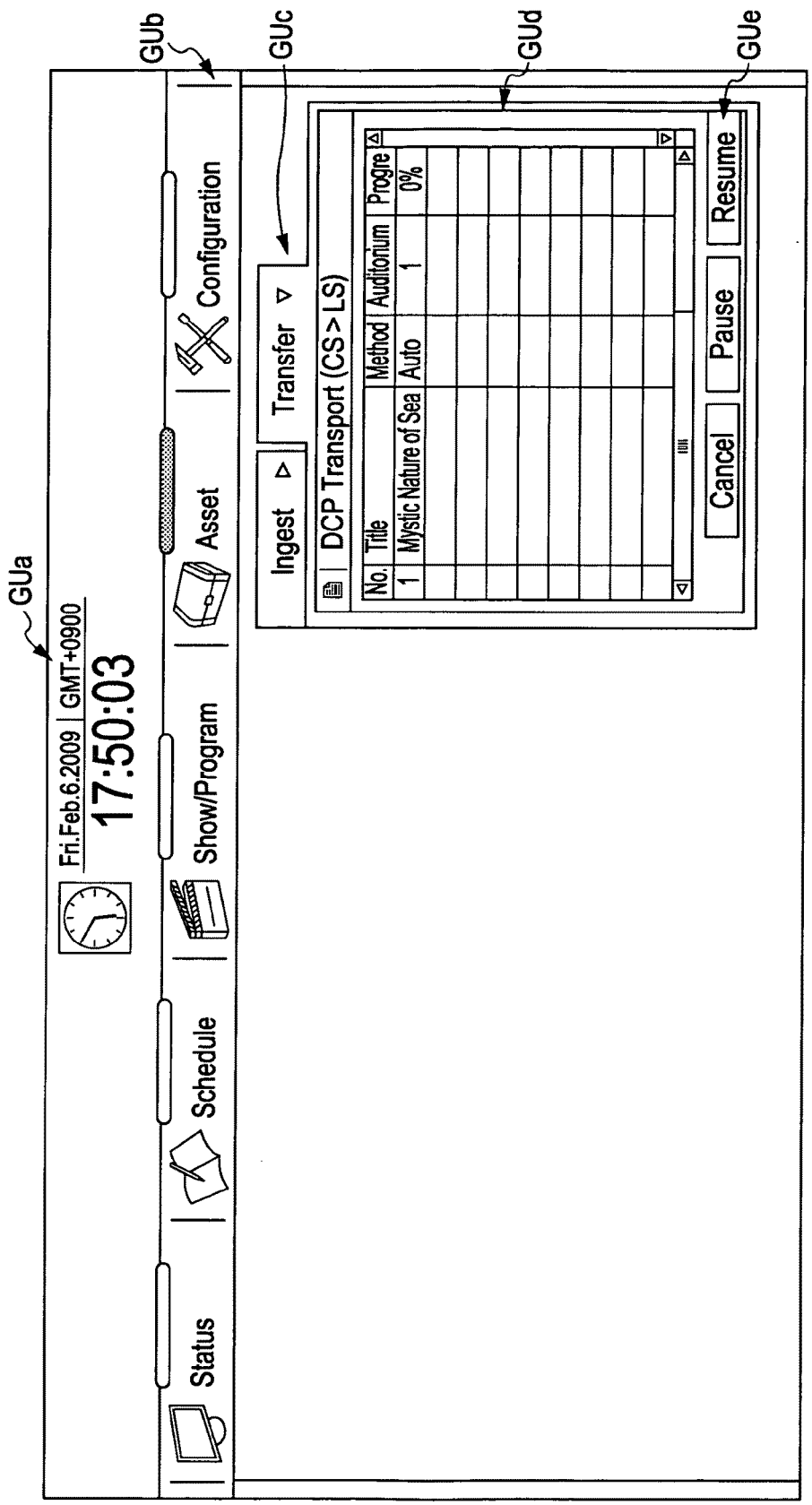
FIG. 12 is a diagram illustrating a transfer task management window.

FIG. 12 illustrates a management window of transfer tasks displayed on a screen of the display unit 203. The management window includes a representation GUa representing the current time and button representations GUb representing the menu items "Status", "Schedule", "Show/Program", "Asset", and "Configuration". Here, when the menu item "Asset" is selected, the tabs GUc for "Transfer" and "Ingest" are displayed. When the "Transfer" tab is selected, a transfer task management window representation GUd is displayed on the screen.

The menu item "Status" is an item which is selected to manage the operation status or the like of individual playback devices. The menu item "Schedule" is an item which is selected to manage the exhibition schedule or the like in individual playback devices. The menu item "Show/Program" is an item which is selected to manage the show playlist, the CPL, and the like. The menu item "Configuration" is an item which is selected to perform various configurations and the like. Moreover, when the "Ingest" tab is selected, a management window showing a capturing status of content is displayed.

In the transfer task management window representation GUd, "DCP Title" shows the title of contents. "Procedure" shows whether the transfer is performed automatically or the transfer starts manually. "Auditorium" shows the number assigned to the auditorium, for example. "Progress" shows the progress state of transfer.

Figure 13:
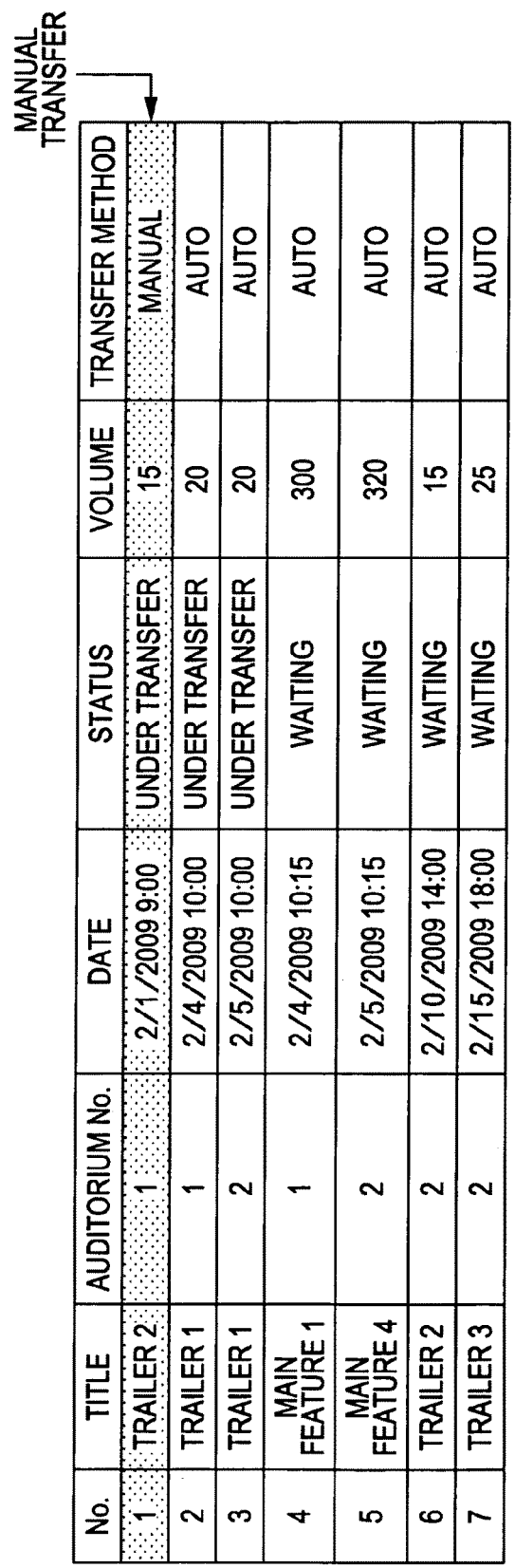
FIG. 13 is a diagram illustrating a case where a manual transfer task is included.

Here, when a preview or the like is presented, the exhibition operator may transfer the data of content to be previewed to the playback device 40 from the control unit 201 or the storage device 30. At that time, when the content is transferred automatically in the order of time or title, there may occur a case where data of the content necessary for the preview are not supplied immediately to the playback device. In such a case, the data of the content that is necessary for the preview are set to be transferred by a manual transfer method, and the order of the transfer tasks is changed as illustrated in FIG. 13 so that the transfer task by the manual transfer has the highest priority. By doing so, the exhibition schedule is able to make sure that desired contents are transferred at the earliest time even when other contents are transferred automatically. Moreover, the use of deletion lock flags to prohibit deletion of contents which will be previewed can prevent data of contents which are not included in the schedule from being automatically deleted and thus make sure that the preview of the contents is presented at a desired time.

The transfer task management window representation GUd includes representations GUe of the buttons "Pause", "Resume", and "Cancel". The control unit 201 temporarily stops the data transfer when the button "Pause" is operated. The control unit 201 resumes the data transfer being stopped temporarily when the button "Resume" is operated. Moreover, the control unit 201 cancels the data transfer when the button "Cancel" is operated. By doing so, the exhibition operator can freely pause, resume, cancel the transfer operation by performing operations using the representations on the screen.

When the automated content transfer process is performed in the described manner, the exhibition operator does not have to transfer manually contents necessary for exhibition to the playback devices of the auditoriums but has only to create the exhibition schedule and store contents supplied from the distribution company to the storage device. Moreover, even when the number of playback devices increases, it is possible to facilitate the supply of contents necessary for the playback devices. Furthermore, since the contents can be transferred automatically, it is possible to prevent exhibition accidents resulting from operation errors and reduce the number of exhibition operators.

In addition, since the contents are selected and transferred based on a vacant capacity of the content storage unit of the playback device and the exhibition schedule, it is possible to use effectively the content storage unit of the playback device. Moreover, it is possible to prevent redundant transfer of contents.

The contents can be transferred effectively when the automated transfer process illustrated in FIG. 4 is performed at the following timings.

The automated transfer process may be executed, for example, when the exhibition schedule is changed. When the exhibition schedule is changed, content to be exhibited or the exhibition date is changed. Therefore, by executing the automated transfer process when the exhibition schedule is changed, data of contents can be stored in the content storage unit 404 of the playback device 40 in accordance with the changed exhibition schedule.

Moreover, the automated transfer process may be executed, for example, when addition, alteration, or the like of content occurs in the storage device. When addition, alteration, or the like of content occurs in the storage device, the contents which can be supplied from the storage device 30 to the playback device 40 are changed. Therefore, by executing the automated transfer process when addition, alteration, or the like of content occurs in the storage device, it is possible to transfer only the transferable contents from the storage device 30 to the playback device 40 to be stored in the content storage unit 404 of the playback device 40.

Moreover, the automated transfer process may be executed, for example, when addition, alteration, or deletion occurs in the contents stored in the playback device. When addition, alteration, or deletion occurs in the contents stored in the playback device, the contents that can be exhibited are changed even when data are not acquired from the storage device 30. Therefore, by executing the automated transfer process when addition, alteration, or deletion occurs in the contents stored in the playback device, it is possible to store data of the contents to be scheduled for exhibition in the content storage unit 404 of the playback device 40.

Furthermore, the automated transfer process may be executed, for example, when communication between the storage device 30 and the playback device 40 is recovered. When there are communication errors between the storage device 30 and the playback device 40, there is concern that data of contents are not properly stored in the content storage unit 404 of the playback device 40. For example, when a fault occurs on a communication path or devices are being replaced in the content storage unit 404 of the playback device 40, the transferred content data might not be properly stored in the content storage unit 404 of the playback device 40. Therefore, by executing the automated transfer process when the communication errors are recovered, it is possible to store properly the data of the content scheduled for exhibition in the content storage unit 404 of the playback device 40. Moreover, it is possible to execute the fault recovery operation immediately and without fail.

The digital cinema management device and the digital cinema management method according to the embodiment of the present invention may be implemented by a computer device. In this case, a computer program for causing the computer device to function as the digital cinema management device may be provided, for example, in a computer-readable format to a general computer system capable of executing various computer codes. For example, the computer program may be provided in the form of a storage medium such as an optical disc, a magnetic disc, or a semiconductor memory, or a communication medium such as a network. By providing the computer program in the computer-readable format, processing corresponding to the computer program is executed on the computer device, whereby the described digital cinema management device and digital cinema management method can be implemented.

It should be understood by those skilled in the art that various modifications, combinations, sub-combinations and alterations may occur depending on design requirements and other factors insofar as they are within the scope of the appended claims or the equivalents thereof.

What is claimed is:

1. A digital cinema management device comprising:
a control unit that supplies data of contents stored in a storage device to a playback device, wherein:
the control unit refers to the contents stored in the storage device, contents stored in a content storage unit of the playback device, and an exhibition schedule, selects contents which are scheduled to be exhibited by the playback device, and which are not stored in the content storage unit, from the storage device, and supplies data of the selected contents to the playback device,
the control unit selects the contents in the order of the exhibition schedule so as not to exceed a rewritable data capacity of the content storage unit and deletes (i) data of contents that are not included in the selected contents from the content storage unit and (ii) data of contents included in the selected contents which are currently still selected and which have associated therewith an amount of time from a current time until a time for exhibition, which is obtained from the exhibition schedule, which exceeds a predetermined amount of time.

2. The digital cinema management device according to claim 1, wherein the control unit sets contents in the order of the exhibition schedule so as not to exceed the rewritable data capacity of the content storage unit as transfer target contents and supplies data of the transfer target contents to the playback device.

3. The digital cinema management device according to claim 2, wherein the control unit sets contents obtained by excluding contents which are not stored in the storage device from the contents selected in the order of the exhibition schedule so as not to exceed the rewritable data capacity of the content storage unit as the transfer target contents and supplies data of the transfer target contents to the playback device.

4. The digital cinema management device according to claim 2, wherein the control unit creates transfer tasks for supplying data of contents to the playback device to supply the data based on the transfer tasks and registers the transfer target contents on the transfer tasks while excluding contents which have already been registered.

5. The digital cinema management device according to claim 1, wherein the control unit selects data of the contents and supplies the data to the playback device when the exhibition schedule is changed.

6. The digital cinema management device according to claim 1, wherein the control unit selects data of the contents and supplies the data to the playback device when addition or alteration of content data occurs in the storage device.

7. The digital cinema management device according to claim 1, wherein the control unit selects data of the contents and supplies the data to the playback device when addition, alteration, or deletion occurs in the content data in the content storage unit of the playback device.

8. The digital cinema management device according to claim 1, wherein the control unit selects data of the contents and supplies the data to the playback device when communication between the control unit and the playback device is recovered.

9. A digital cinema management method comprising the steps of:

causing a control unit that supplies data of contents stored in a storage device to a playback device to refer to the contents stored in the storage device, contents stored in a content storage unit of the playback device, and an exhibition schedule, thereby selecting contents which are scheduled to be exhibited by the playback device, and which are not stored in the content storage unit, from the storage device, and causing the control unit to supply data of the selected contents to the playback device, in which the control unit selects the contents in the order of the exhibition schedule so as not to exceed a rewritable data capacity of the content storage unit and deletes (i) data of contents that are not included in the selected contents from the content storage unit and (ii) data of contents included in the selected contents which are currently still selected and which have associated therewith an amount of time from a current time until a time for exhibition, which is obtained from the exhibition schedule, which exceeds a predetermined amount of time.

* * * * *